United States Patent [19]

Fessenden

[11] 4,229,950
[45] Oct. 28, 1980

[54] COUPLING FOR END GUDGEON AND INTERNALLY HEATED ROLLER

[75] Inventor: John R. Fessenden, Rochester, N.Y.

[73] Assignee: Eastman Kodak Company, Rochester, N.Y.

[21] Appl. No.: 16,869

[22] Filed: Mar. 2, 1979

[51] Int. Cl.³ .............................................. A42B 3/00
[52] U.S. Cl. .......................................... 64/5; 29/123; 29/129; 285/321; 285/403
[58] Field of Search ...................... 64/5; 29/123, 129; 74/240, 471 R; 403/299, 358, 332, 367, 356; 285/321, 27, 403

[56] References Cited

U.S. PATENT DOCUMENTS

| | | | |
|---|---|---|---|
| 2,538,499 | 1/1951 | Benoit | 64/5 |
| 2,720,691 | 10/1955 | Kuniholm | 29/123 |
| 2,818,499 | 1/1958 | Veach | 74/240 |
| 2,877,732 | 3/1959 | Eaton | 403/299 |
| 3,381,983 | 5/1968 | Hanes | 285/321 |
| 3,805,550 | 4/1974 | Patton | 64/5 |
| 3,822,953 | 7/1974 | Adelizzi | 403/356 |
| 3,850,400 | 11/1974 | Cooper | 64/5 X |

OTHER PUBLICATIONS

Research Disclosure Bulletin, vol. 130, p. 23, Feb. 1975.

*Primary Examiner*—Henry K. Artis
*Attorney, Agent, or Firm*—Lawrence P. Kessler

[57] ABSTRACT

An improved coupling for the core of a heated rotatable member and the support and drive for the core. The core has a surface including a first wall and a second wall spaced from and angularly disposed to the first wall which define a groove in the surface. Drive means, such as an end gudgeon, is mounted in juxtaposition with the groove for supporting and rotating the core. The coefficient of thermal expansion of the drive means is different from that of the core. A coupling, which compensates for unequal thermal expansion or contraction of the drive means and the core, has a first portion engaging the drive means to maintain support and rotation of the core by the drive means. The coupling further has a second portion extending at least partially into the groove spaced from the first wall to accommodate for movement between the drive means and the core resulting from unequal thermal expansion or contraction because of temperature change.

10 Claims, 2 Drawing Figures

COUPLING FOR END GUDGEON AND INTERNALLY HEATED ROLLER

BACKGROUND OF THE INVENTION

1. Field of the Invention

This invention relates generally to internally heated rollers, and more particularly to a coupling for securely mounting a gudgeon in driving engagement with an internally heated roller.

2. Description of the Prior Art

In the printing and paper making industries, internally heated rollers are commonly used to feed paper sheets and simultaneously perform some processing step on the paper. For example, an internally heated roller may serve as a pressure roll fuser for electrographic copiers, or as a calender in making paper. In such applications, the roller is supported on gudgeons and is rotated by a drive mechanism connected to the roller through the gudgeons. Heat through the surface of the roller accomplishes the desired fixing of toned images to the sheets or calendering of the paper. In order to decrease heat losses through the ends of the roller to the surrounding environment, the gudgeons on the end of the roller are generally constructed of a material having a relatively low thermal conductivity (e.g. plastic). However, such materials generally do not match the physical characteristics of the roller (e.g. metal) in, for example, strength, stiffness or rate of thermal expansion. Thus, it is difficult to maintain the drive connection between the internally heated roller and its end gudgeons.

Volume 130, page 23, of the *Research Disclosure Bulletin*, published in Hampshire, United Kingdom, shows several configurations of internally heated rollers and their end gudgeons. These configurations are intended to minimize the effect of different physical characteristics so that the gudgeons support and drive an associated roller over extended temperature ranges without loosening, becoming relatively eccentric, or inducing excessive stresses in the roller. In each of the depicted configurations bolts are used to secure the gudgeons to the roller. While such configurations do improve operating characteristics, repetitive heating and cooling of the roller frequently cause the bolts to relax the coupling between the gudgeon and roller or ultimately to fracture.

SUMMARY OF THE INVENTION

This invention is directed to an improved coupling for the core of a heated rotatable member and the support and drive for the core. The core has a surface including a first wall and a second wall, spaced from and angularly disposed to the first wall, which define a groove in the surface. Drive means, such as an end gudgeon, is mounted in juxtaposition with the groove for supporting and rotating the core. The coefficient of thermal expansion of the drive means is different from that of the core. A coupling, which compensates for unequal thermal expansion or contraction of the drive means and the core, has a first portion engaging the drive means to maintain support and rotation of the core by the drive means. The coupling further has a second portion extending at least partially into the groove spaced from the first wall and in slidable engagement with the second wall to accommodate for movement between the drive means and the core resulting from unequal thermal expansion or contraction. The surface of the core may be an internal peripheral surface defining a bore in at least one end of the core so that the groove in the surface is annular in configuration. The coupling may then be a radially resilient open ring with one lateral surface engaging the drive means and the other lateral surface having a beveled edge in complimentary engagement with the second wall of the groove.

The invention, and its objects and advantages, will become more apparent in the detailed description of the preferred embodiment presented below.

BRIEF DESCRIPTION OF THE DRAWINGS

In the detailed description of the preferred embodiment of the invention, reference is made to the accompanying drawings, in which.

DESCRIPTION OF THE PREFERRED EMBODIMENT

Figure 1:
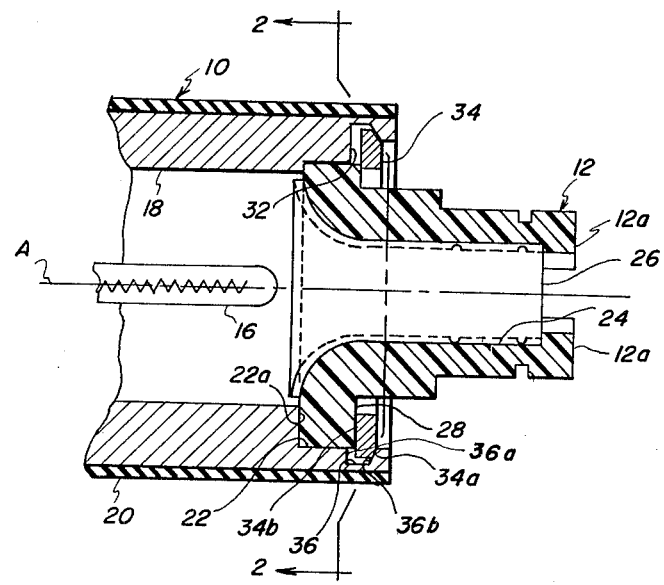
FIG. 1 is a side elevational view, in cross-section, of one end of an internally heated roller and its end gudgeon showing the coupling according to this invention.
Figure 2:
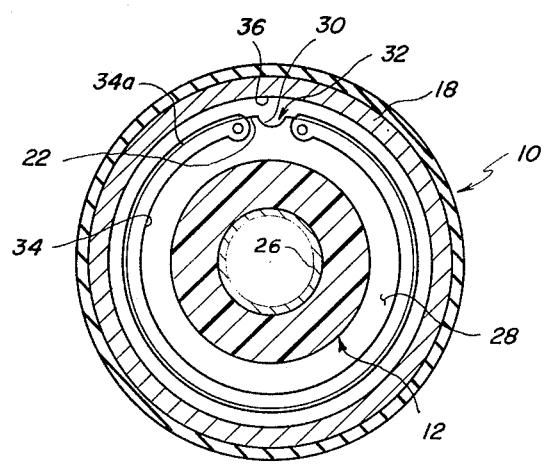
FIG. 2 is an end elevational view, in cross-section, of the apparatus of FIG. 1 taken along lines 2—2 of FIG. 1.

Referring now to the drawings, an internally heated roller 10 is shown with a gudgeon 12 for supporting the roller. For ease of illustration only one end of the roller 10 and its respective gudgeon are shown, the opposite end being preferably of identical (but mirrored) construction. At least one of the gudgeons is rotatively driven by a power source (not shown) through lugs 12a about longitudinal axis A of the roller. The roller 10 has an internal heat source, such as a lamp 16 and includes a cylindrical core 18 of heat conducting material, such as aluminum or steel. The thermal conductivity of the core 18 enables the roller to be used in applications where heat transmission through the peripheral surface of the roller is desired. When the roller 10 is to be used, for example, as a fuser roller for fixing toned images in a printer or electrophotographic copier, the core 18 may be covered with a heat conducting compliant sleeve 20, such as carbon filled silicone rubber providing a desirable offset preventing surface. The end of the core 18 includes a concentric bore 22 having an interior end wall 22a which forms a seat for the gudgeon 12.

The gudgeon 12 is formed of a material of relatively low thermal conductivity, but high strength characteristics. Some preferred materials having these desired physical characteristics include glass or mineral filled epoxys or phenolics (e.g. Plaskon ® available from Allied Chemical Corp.), or glass or carbon fiber filled polyimides or polyamides. A gudgeon formed of any of the preferred materials substantially reduces heat loss through the end of the heated roller, and is of sufficient strength to support and transmit rotation to the roller. A concentric bore 24 may be formed in the gudgeon to accept a heat shield 26 for further decreasing heat losses through the end of the roller. The gudgeon 12 has an annular shoulder 28, the diameter of which is substantially equal to the diameter of the bore 22 and is received in the bore against end wall 22a.

The drive interconnection between the gudgeon 12 and the roller 10 may be provided by a keyway 30 in shoulder 28 of the gudgeon which mates with a key 32 integral with the core 18 and extending into the bore 22.

Alternatively, the key may be an independent member inserted in a keyway formed by complimentary shaped openings in the shoulder 28 and the core 18. Thus, when the gudgeon 12 is rotated, the roller 10 is rotatively driven about its longitudinal axis.

In an electrophotographic copier, for example, the lamp 16 may heat the roller core 18 over an operative range from room temperature to approximately 600° F. so that the surface 20 is of high enough temperature to accomplish fusing (approximately 375° F.). Heating of the roller core (and gudgeon 12) by the lamp may be continuous or intermittent. In either instance, the roller and gudgeon exhibit unequal thermal expansion or contraction during periods of temperature change due to the differing thermal expansion characteristics of their respective materials. As noted above, unequal expansion or contraction can cause eccentricity in the drive of the roller by the gudgeon, or ultimately completely release the drive coupling therebetween. To prevent such unequal thermal expansion or contraction from adversely effecting the drive coupling, a coupling element is provided to constantly urge the gudgeon 12 into engagement with end wall 22a of the bore 22 in the roller 10. The coupling element is a substantially cylindrical open ring 34 (e.g. a Tru Arc ® ring) formed of radially resilient material so that the diameter of the ring may increase or decrease.

The ring 34 is received in an annular groove 36 formed in the internal peripheral surface of the core 18 between the interior end wall 22a and the end of the roller 10. The groove 36 has a first side wall 36a and a second side wall 36b spaced from and angularly disposed to the first side wall. The diameter of the ring 34 is selected so that in its free state, it is smaller than the maximum diameter of the groove 36, but larger than the minimum diameter. A peripheral edge 34a of the ring is beveled so as to be substantially complimentary to the side wall 36b of the groove.

Upon assembly, the gudgeon 12 is seated on the end wall 22a of the bore 22 with the key 32 received in the keyway 30. The ring 34 is then compressed and inserted into the groove 36 adjacent to the wall 36. If the key is an independent member, the opening of the ring is positioned to straddle the keyway to enable the key to be inserted into the keyway. Because the ring is radially resilient, it expands in the groove until the beveled edge 34a engages the tapered side wall 36b. The location of the groove 36 between the end wall 22a and the end of the roller is particularly selected so that as the beveled edge 34a of the ring 34 wedges against the tapered side wall 36b the lateral surface 34b of the ring engages the shoulder 28 of the gudgeon and urges the gudgeon into positive engagement with the end wall 22a. The width of the groove is such that over the entire operative temperature range (and all thermal expansion or contraction of the core 18 and gudgeon 12) the ring 34 remains wedged in engagement between the shoulder 28 and the side wall 36b. Thus, the expansion force of the compressed ring exerted on the side wall 36b has a reaction component parallel to the axis A which causes the ring to constantly urge the shoulder 28 of the gudgeon into engagement with the end wall 22a over the entire operative temperature range. The gudgeon is thus captured in the roller 10; and further, the friction forces between the engaging surfaces increase the effectiveness of the drive coupling.

In operation, unequal thermal expansion or contraction of the gudgeon and roller, due to changes in temperature from heat generated by the lamp 16, causes the portion of the shoulder 28 engaging the surface 34b of the ring 34 to move axially relative to the groove 36. If the shoulder expands more than the core, an axial force is imparted to the ring 34 to move the ring to the right in FIG. 1. In reaction to such axial force, the ring 34 moves axially in the groove 36, with the beveled edge 34a sliding on the complimentary tapered wall 36b to radially compress the ring. On the other hand, if the shoulder expands less than the core (or contracts relative to the core), the ring is free to expand radially due to its resilience. Such radial expansion causes the ring to slide on the tapered wall 36b and move to the left in FIG. 1 to maintain engagement with the shoulder 28 and corresponding engagement of the shoulder and end wall 22a. Such axial and radial movement thus accommodates for the unequal thermal expansion or contraction of the gudgeon and roller while maintaining the gudgeon 12 securely seated against the end wall 22a of the bore 22. This insures the effectiveness of the drive coupling between the gudgeon and the roller over the entire operative temperature range.

The invention has been described in detail with particular reference to a preferred embodiment thereof, but it will be understood that variations and modifications can be effected within the spirit and scope of the invention.

What is claimed is:

1. A heated rotatable member comprising:
    a core having a surface including a first wall and a second wall spaced from and angularly disposed relative to said first wall for defining a groove in said surface;
    drive means mounted in juxtaposition with said groove for supporting and rotating said core, the coefficient of thermal expansion of said drive means being different from that of said core; and
    means for compensating for unequal thermal expansion and contraction of said drive means and said core, said compensating means having a first portion engaging said drive means to provide support for and rotation of said core by said drive means, and a second portion extending at least partially into said groove spaced from said first wall and in slidable engagement with said second wall to accommodate for movement between said drive means and core resulting from said unequal thermal expansion and contraction.

2. The invention of claim 1 wherein said surface of said core is an internal peripheral surface defining a coaxial bore in at least one end of said core, said bore further having an end wall defining a seat for said drive means, and wherein said first and second walls are circumferentially disposed in said peripheral surface to define an annular groove.

3. The invention of claim 2 wherein said drive means comprises a gudgeon having an annular shoulder disposed in said bore, said shoulder having a face bearing against said end wall; and
    means for keying said shoulder to said core to transmit rotation of said gudgeon to said core.

4. The invention of claim 3 wherein said compensating means comprises a radially resilient open ring having opposing lateral surfaces, one of said surfaces being said first portion and engaging said shoulder of said gudgeon, and the other of said surfaces being said second portion and having a beveled edge substantially complimentary to said second wall.

5. The invention of claim 4 wherein said annular groove is located a preselected distance from said end wall such that said beveled edge of said second portion is wedged against said second wall of said groove and said lateral surface of said first portion is maintained in engagement with said shoulder of said gudgeon for all relative locations of said gudgeon and said core due to unequal thermal expansion and contraction.

6. Means for drivingly coupling a support gudgeon of a first thermal expansion characteristic to an internally heated roller of a different thermal expansion characteristic, said means comprising:
   a first circumferential wall and a second circumferential wall, spaced from and angularly disposed relative to said first wall, for defining an annular groove in said roller; and
   means for urging said support gudgeon into coupled engagement with said roller, said urging means having a first portion operatively connected to said gudgeon and a second portion extending at least partially into and in sliding engagement with said second wall, whereby unequal thermal expansion and contraction of said support gudgeon and roller is compensated for by sliding movement of said urging means in said groove to maintain said support gudgeon in coupled engagement with said roller throughout an operating range of temperatures.

7. The invention of claim 6 wherein said urging means comprises a radially resilient open ring having opposing lateral surfaces, one of said surfaces defining said first portion, and the other of said surfaces having a beveled edge substantially complimentary to said second wall and defining said second portion.

8. For use with an internally heated roller having a cylindrical core of a first thermal expansion characteristic, an internal peripheral surface in said core defining a coaxial bore in at least one end of said core, a first circumferential side wall in said surface and a second circumferential side wall in said surface spaced from and angularly disposed relative to said first side wall for defining an annular groove in said core, and a gudgeon of a different thermal expansion characteristic received in said bore in driving engagement with said core, means for urging said gudgeon into coupled supporting and driving engagement with said core regardless of unequal expansion or contraction of said gudgeon and said core because of temperature changes, said urging means comprising:
   an element in engagement with said gudgeon for urging said gudgeon into said bore to maintain said gudgeon in supporting and driving engagement with said core, said element extending at least partially into said annular groove, and having a portion in sliding engagement with said second side wall, whereby unequal thermal expansion or contraction of said gudgeon and said core is compensated for by sliding movement of said element in said annular groove which maintains said gudgeon and said core in engagement.

9. The invention of claim 8 wherein said element is a radially resilient open ring having opposing lateral surfaces, one of said surfaces being in engagement with said gudgeon to capture said gudgeon in said bore, and the other of said surfaces having a beveled edge substantially complimentary with said second side wall and defining said sliding portion of said element.

10. In a roller having a longitudinal axis and a coaxial support member, a roller mounting providing for unequal thermal expansion characteristics of the roller and the support member, said mounting comprising:
   a shoulder on said roller against which said support member seats in an axial direction, a retainer element engaging said roller and engaging said support member in the opposite axial direction, and cooperating accomodating surfaces on said retainer element and roller, said surfaces being angled with respect to the axis to cause movement of said retainer element radially toward or away from the axis in response to thermal contraction or expansion of said support member relative to said roller.

* * * * *